United States Patent [19]

Nishikawa et al.

[11] Patent Number: 5,264,947
[45] Date of Patent: Nov. 23, 1993

[54] COPYING DEVICE FOR PRODUCING A LABEL

[75] Inventors: Hiroshi Nishikawa, Nagoya; Yasuhiro Shibata, Okazaki; Takahiro Miwa, Konan, all of Japan

[73] Assignee: Brother Kogyo Kabushiki Kaisha, Nagoya, Japan

[21] Appl. No.: 889,367

[22] Filed: May 28, 1992

[30] Foreign Application Priority Data

Jun. 13, 1991 [JP] Japan .............................. 3-044513[U]
Jun. 20, 1991 [JP] Japan .............................. 3-046591[U]

[51] Int. Cl.⁵ .......................... H04N 1/10; H04N 1/23
[52] U.S. Cl. ..................................... 358/473; 358/497; 358/296
[58] Field of Search ............... 358/296, 473, 472, 497, 358/494, 471, 401; 382/59

[56] References Cited

U.S. PATENT DOCUMENTS 4,319,283  3/1982  Ozawa et al. .
5,124,801  6/1992  Shinmura et al. .................. 358/473

FOREIGN PATENT DOCUMENTS 0066625  12/1982  European Pat. Off. .
0355863   2/1990  European Pat. Off. .
60-244150 12/1985  Japan .

*Primary Examiner*—Edward L. Coles, Sr.
*Assistant Examiner*—Scott A. Rogers
*Attorney, Agent, or Firm*—Oliff & Berridge

[57] ABSTRACT

To provide a device which can easily copy an image within a limited area of an original. A reading window is defined in a lower projecting portion of a housing which is L-shaped in side elevation, providing a visual recognition member. The visual recognition member allows the user to visually recognize the image to be copied over which the housing is placed. When a start button is depressed, a sensor is reciprocally moved by a wire. An image read by the sensor is printed on a tape by a print head. The printed head tape is fed by a tape feed roller operatively coupled by a gear train to a motor which also drives the wire through a gear train.

18 Claims, 9 Drawing Sheets

COPYING DEVICE FOR PRODUCING A LABEL

BACKGROUND OF THE INVENTION

1. Field of the Invention

The present invention relates generally to a handy-type copying device, and more particularly to a handy-type copying device for copying one or more character strings without breaking them.

2. Description of the Prior Art

There are many cases where we may want to copy some items from an original material to produce a label for affixing to copied material. For example, when a backup diskette is created from an original software diskette for use in a two disk drive system of a personal computer, the user may want to affix a label referencing the software to the backup diskette. If the backup diskette has a label indicating the title of the software, diskette number or the like, it is convenient for the user to identify the diskette.

It is general that an original material carries a printed list of various items. To copy the printed list with a hand-held copying machine with a roll of thermal paper, the reader of the hand-held copying machine may be held against an area to be copied, and moved to a desired position thus copying the titles and other information. Another way of copying the printed list is to use a character tape producing machine which prints desired characters or the like on an adhesive tape. The characters and numerals such as "ABC SOFTWARE Ver. 1.0" are entered through an input device such as a keyboard or the like, and printed on the adhesive tape. According to still another method, the object is read by an image reader, and the thus read data is inputted to a personal computer set. The read data is then printed on a print paper by a printer, and the printed paper is cut into a tape.

However, the aforesaid conventional devices have suffered the following drawbacks. In the case of using a hand-held copying machine, since the copying machine is manually moved by the user while copying the desired object, it is difficult to move the copying machine linearly at constant speed. The copied character string or strings tend to be undulated or interrupted. In the case of a character tape producing machine, it is inconvenient to print characters other than alphanumerals, such as in the case of printing chinese characters, since the user has to search a target character among a plurality of options. Besides, the character tape producing machine is expensive because it is made up of a number of electronic components. In the case of a personal computer set, the use of the image reader, the cutting of the printed paper into a long narrow tape, etc. results in a procedure that is tedious and time-consuming.

SUMMARY OF THE INVENTION

In view of the above problems of the conventional devices, it is an object of the present invention to provide an inexpensive small-size or handy-type copying machine which is capable of easily copying a character string from original material without disturbing the alignment of the character string.

To achieve the above object, there is provided in accordance with the present invention a handy-type copying device which includes a window means for defining a maximum range of copying area. A visual recognition means is provided so that an operator can visually recognize an image falling within the window means when an object to be copied is held against the window means. The device further includes a reading means for reading the image falling within the window. The reading means has a plurality of reading elements aligned in a predetermined direction and is reciprocal with forward and backward movements in a direction intersecting the predetermined direction. A printing means is provided for printing the image read by the reading means on a printing medium while moving at least one of the printing medium and the printing means relative to each other. The device includes control means for controlling the printing means to carry out printing of the image on a line-to-line basis as the plurality of reading elements read the image.

A start button is provided for starting a copying operation, wherein the reading means moves forwardly from a home position during a time when the start button is being depressed, whereas the reading means moves back to the home position when the start button is released.

In use, the copying device is placed on the object, and the window means is held against the surface of the object to be copied while visually observing the object through the window means. Then, the reading means is forwardly moved to read the image printed on the surface of the object. The image is printed on an elongated, web-like printing medium by the printing means, and the printed medium is discharged out of the copying device.

BRIEF DESCRIPTION OF THE DRAWINGS

The particular features and advantages of the invention as well as other objects will become apparent from the following description taken in conjunction with the accompanying drawings, in which.

DETAILED DESCRIPTION OF THE PREFERRED EMBODIMENTS

The expressions "front", "rear", "upper", "lower", "right" and "left" are used throughout the description to define the various parts when the handy-type copying device of the present invention is disposed in an orientation in which it is intended to be used.

A first embodiment of the present invention will be described with reference to FIGS. 1A, 1B, 2A and 2B.

Figure 1A:
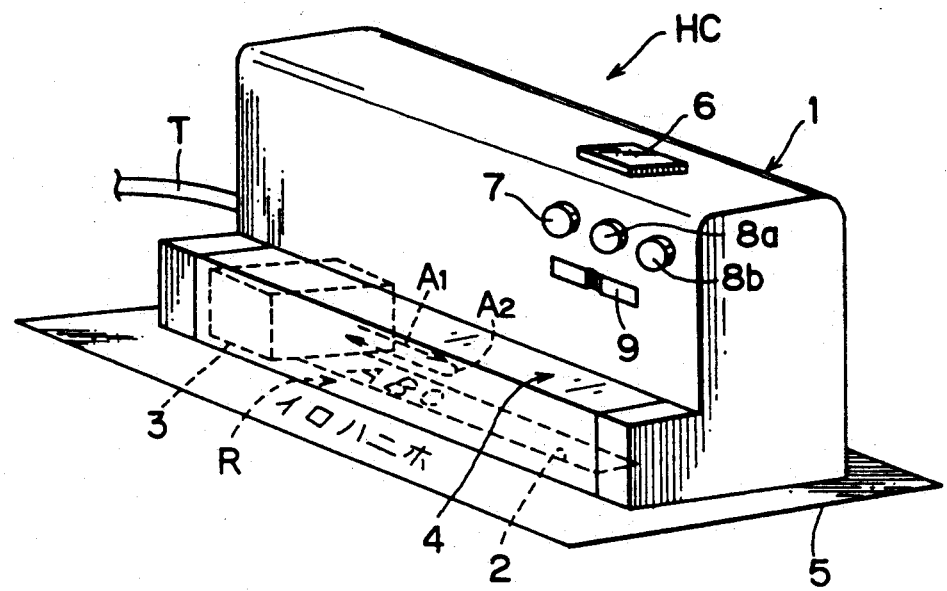
FIG. 1A is a perspective view of a handy-type copying device according to a first embodiment of the present invention.

As shown in FIG. 1A, a handy-type copying device HC of the present invention has a housing 1 which is L-shaped as viewed in side elevation. The housing 1 has an elongated rectangular-shape reading window 2 defined in a lower surface thereof. A sensor 3 is housed in the housing 1 to be laterally movable above and along the reading window 2 in the directions indicated by arrows $A_1$, $A_2$. A viewfinder 4 made of a transparent material is disposed on a front portion of the housing 1. Through the viewfinder 4, the user can recognize a printed character string R on a printed document 5 held against the lower surface of the housing 1. A start button 6 is disposed on an upper surface of the housing 1. During a time when the start button 6 is being depressed, the sensor 3 moves in the direction indicated by the arrow $A_1$ from a home position to read the character string R. When the start button 6 is released, the sensor 3 moves in the direction indicated by the arrow $A_2$ back to the home position, and then a drive motor is de-energized after elapse of a predetermined period of time from the release of the start button 6. The housing 1 supports, on its righthand front wall, a foreground reverse switch 7 for reversing foreground print characters from white to black or vice versa, and density setting switches 8a, 8b for setting a white-and-black reverse reference level depending on the image density of an object to be read. A reading width setting slider 9 is positioned below the switches 7, 8a, 8b for setting a range of height of the characters to be read.

Figure 1B:
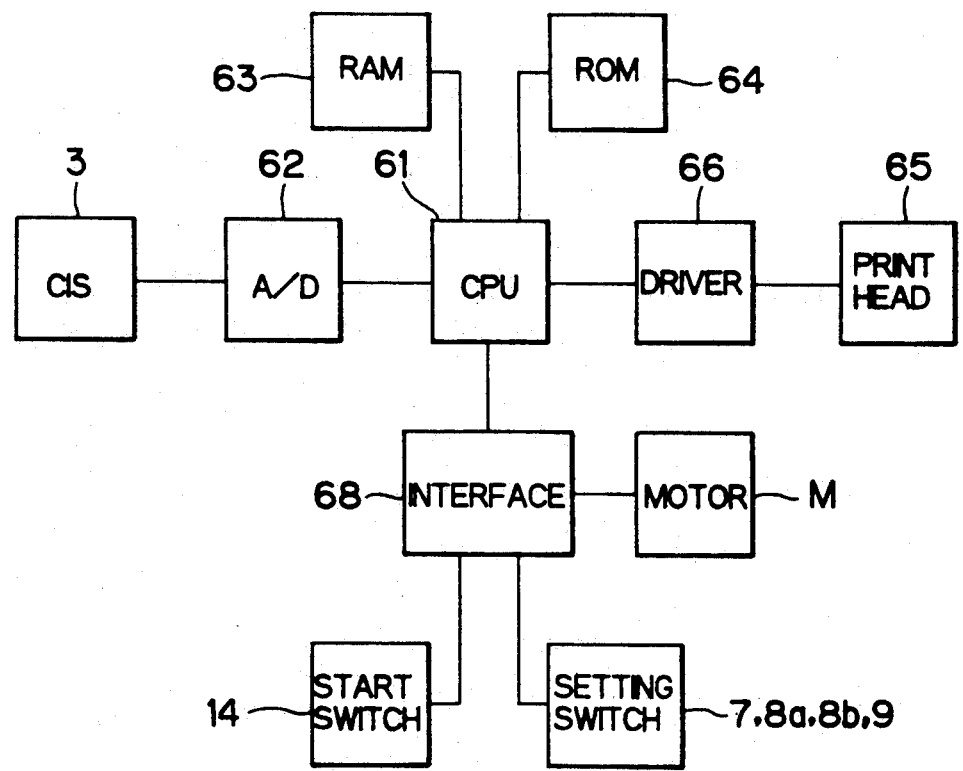
FIG. 1B is a block diagram of a control system of the handy-type copying device according to the first embodiment.

As shown in FIG. 1B, a control system of the handy-type copying device HC includes a central processing unit (CPU) 61 for governing the device HC in its entirety in accordance with a program stored in a read-only memory (ROM) 64. The sensor 3 is composed of sixty-four contact image sensors (CISs) aligned in a direction perpendicular to the longitudinal direction of the reading window 2. The CISs may be arranged on a line which forms an appropriate angle with respect to the longitudinal direction of the reading window 2. Each CIS is connected to the CPU 61 through an analog-to-digital (A/D) converter 62 for converting an analog signal into a digital signal ranging in decimal notation from 0 to 255. A random access memory (RAM) 63 is connected to the CPU 61 for temporarily storing data read by the sensor 3. A driver 66 for driving a print head 65 is also connected to the CPU 61. A start switch 14 is arranged with the start button 6. A motor M, and various switches including the reverse switch 7, the density setting switches 8a, 8b and the reading width setting slider 9 are further connected to the CPU 61 through an interface 68.

Figure 2A:
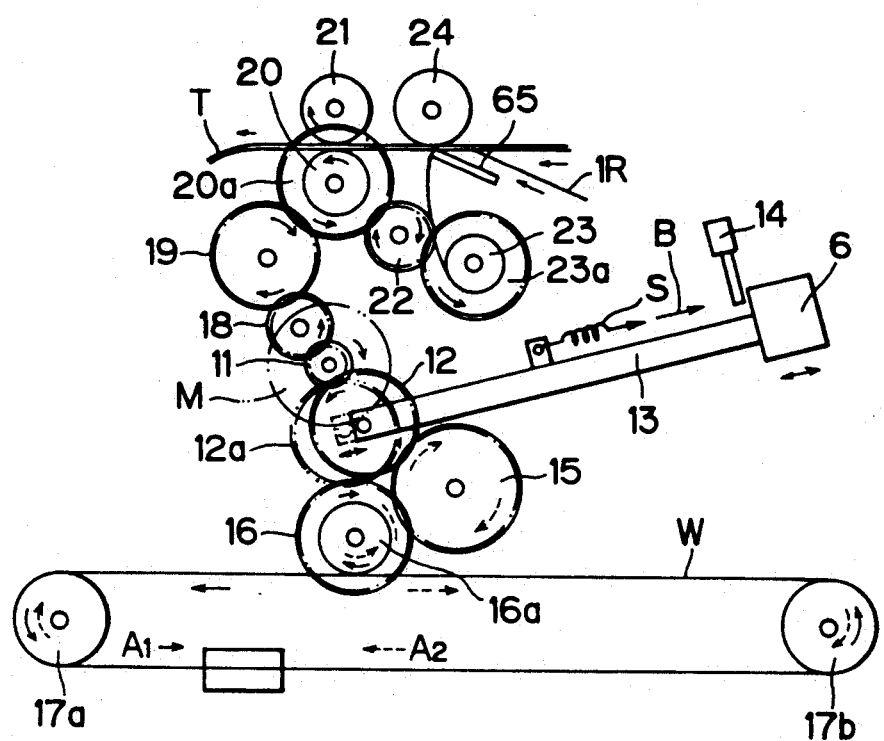
FIG. 2A is a view of gear trains used to feed a sensor of the handy-type copying device according to the first embodiment.

Lateral movement of the sensor 3 and feeding of a tape T will be described with reference to FIGS. 2A and 2B. FIG. 2A mainly shows gear trains used to move the sensor laterally, and FIG. 2B mainly shows gear trains used to print reduced and enlarged characters on the tape T. In both cases, the sensor 3 and the tape T are driven by the same motor M.

As shown in FIG. 2A, the motor M has an output gear 11 meshingly engaging a selector gear 12 mounted on an end of a lever 13 with the start button 6 attached to the other end thereof. The lever 13 is normally urged in the direction indicated by arrow B by virtue of a spring S. The selector gear 12 is normally held in meshing engagement with an idle gear 15. When the start button 6 is depressed, the selector gear 12 is shifted out of mesh with the idle gear 15 into a position 12a in which it meshingly engages a wire drive gear 16 having a pulley 16a around which there is trained a wire W that is also trained around and extends between two pulleys 17a, 17b. The sensor 3 is coupled to the wire W.

The output gear 11 meshingly engages a large-diameter gear 19 through a small-diameter gear 18, and the large-diameter gear 19 meshingly engages a gear 20a fixed to a tape feed roller 20. An auxiliary roller 21 for pressing the tape T is disposed upwardly of the tape feed roller 20 which is held in meshing engagement with an idle gear 22 meshing with a gear 23a fixedly secured to a takeup shaft 23 for winding an ink ribbon IR. The ink ribbon IR is supplied from an ink ribbon supply (not shown). The print head 65 and a platen roller 24 are disposed above the takeup shaft 23. The ink ribbon IR is superposed on the tape T and passes between the print head 65 and the platen roller 24.

In operation, when the start button 6 is depressed by the user, the switch 14 is turned on, thereby energizing the motor M to rotate the output gear 11 clockwise. On the other hand, the selector gear 12 is moved into the position 12a attendant to the depression of the start button 6, causing the wire drive gear 16 to rotate clockwise with the meshing engagement of the selector gear 12 with the wire drive gear 16. The wire W and the sensor 3 are thus moved in the direction indicated by the arrow $A_1$.

When the sensor 3 has read the character string R over a predetermined length while the user is visually observing the character string R through the viewfinder 4 (see FIG. 1), the user releases the start button 6, whereby the switch 14 is turned off. The control system is programmed so as to continuously energize the motor M for a predetermined period of time after the switch 14 is turned off. When the start button 6 is released, the selector gear 12 is shifted out of mesh with the wire drive gear 16 and brought into mesh with the idle gear 15 which then rotates the wire drive gear 16 counterclockwise. With the counterclockwise rotation of the wire drive gear 16, the wire W and the sensor 3 coupled thereto are moved in the direction indicated by the arrow $A_2$ and the sensor 3 is brought back to its home position.

Irrespective of whether the start button 6 is depressed or not, the clockwise rotation of the output gear 11 causes the idle gears 18, 19 to rotate the gear 20a counterclockwise to leftwardly feed the tape T, and also causes the idle gear 22 to rotate the gear 23a counterclockwise to wind the ink ribbon IR on the takeup shaft 23. The gear ratios of these gears 20a, 22, 23a are selected so that the tape T and the ink ribbon IR are fed at synchronized speeds. The speed at which the sensor 3 is driven in the direction $A_1$ is equal to the speed at which the tape T is fed so that an equi-magnification copy can be produced.

Printing of "reduced characters" or "enlarged characters" will be described with reference to FIG. 2B. Those parts described with reference to FIG. 2A which are not related to printing of "reduced characters" or "enlarged characters" are omitted in FIG. 2B for the sake of brevity.

Figure 2B:
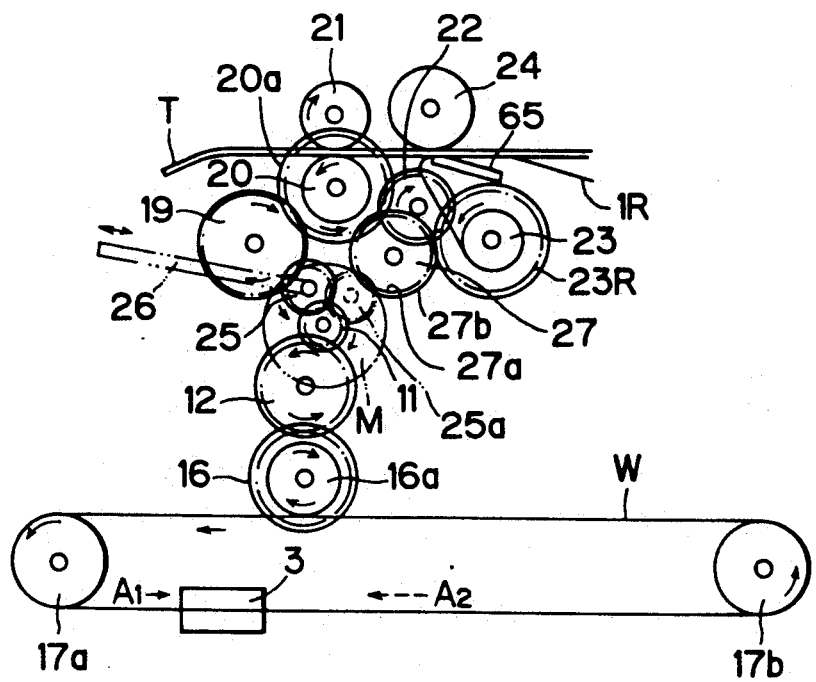
FIG. 2B is a view of gear trains used to print reduced and enlarged characters with the handy-type copying device according to the first embodiment.

As shown in FIG. 2B, a selector gear 25 is in meshing engagement with the output gear 11. The selector gear 25 is normally held in meshing engagement with the idle gear 19. The selector gear 25 is rotatably mounted on one end of a lever 26. When the lever 26 is pressed, the selector gear 25 is moved into a position 25a in which the gear 26 is brought in meshing engagement with a first gear 27a. The first gear 27a is coaxially fixed to a second gear 27b whose number of teeth is smaller than the number of teeth of the first gear 27a. The second gear 27b is held in meshing engagement with the gear 20a. The gears 20a, 23 rotate at a lower speed when the lever 26 is pressed with a selection of a gear train consisting of gears 11, 25, 27a, 27b, 20a, 22, 23a than when the lever 26 is retracted to a position in which a gear train consisting of gears 11, 25, 19, 20a, 22, 23a is selected.

When the lever 26 is pressed, the gears 20a, 23 rotate at the lower speed, and characters are printed on the tape T in a laterally reduced size. The gear ratio of the gears 19, 27 may be varied to print characters on the tape T in a laterally enlarged size.

As shown in FIGS. 2A and 2B, since the sensor 3 and the tape T are synchronously fed by the single motor M, the rotational speed of the motor M is not required to be highly arcuate, and the motor M used may be relatively inexpensive.

A second embodiment of the present invention will next be described with reference to FIGS. 3, 4A and 4B. Both the external structure and control system of the second embodiment are identical to those shown in FIGS. 1A and 1B.

Figure 3:
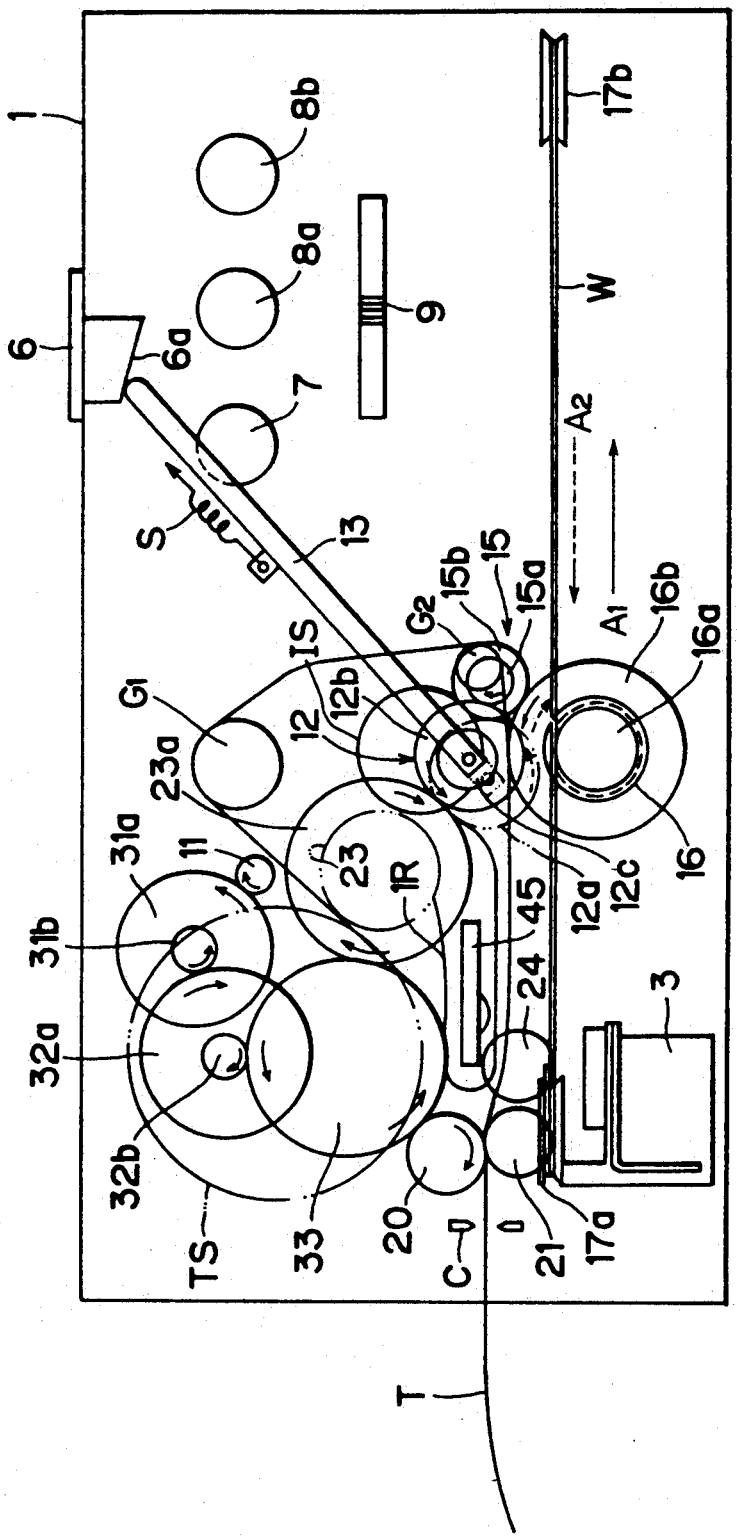
FIG. 3 is a view showing gear trains of a handy-type copying device according to a second embodiment of the present invention.
Figures 4A, 4B:
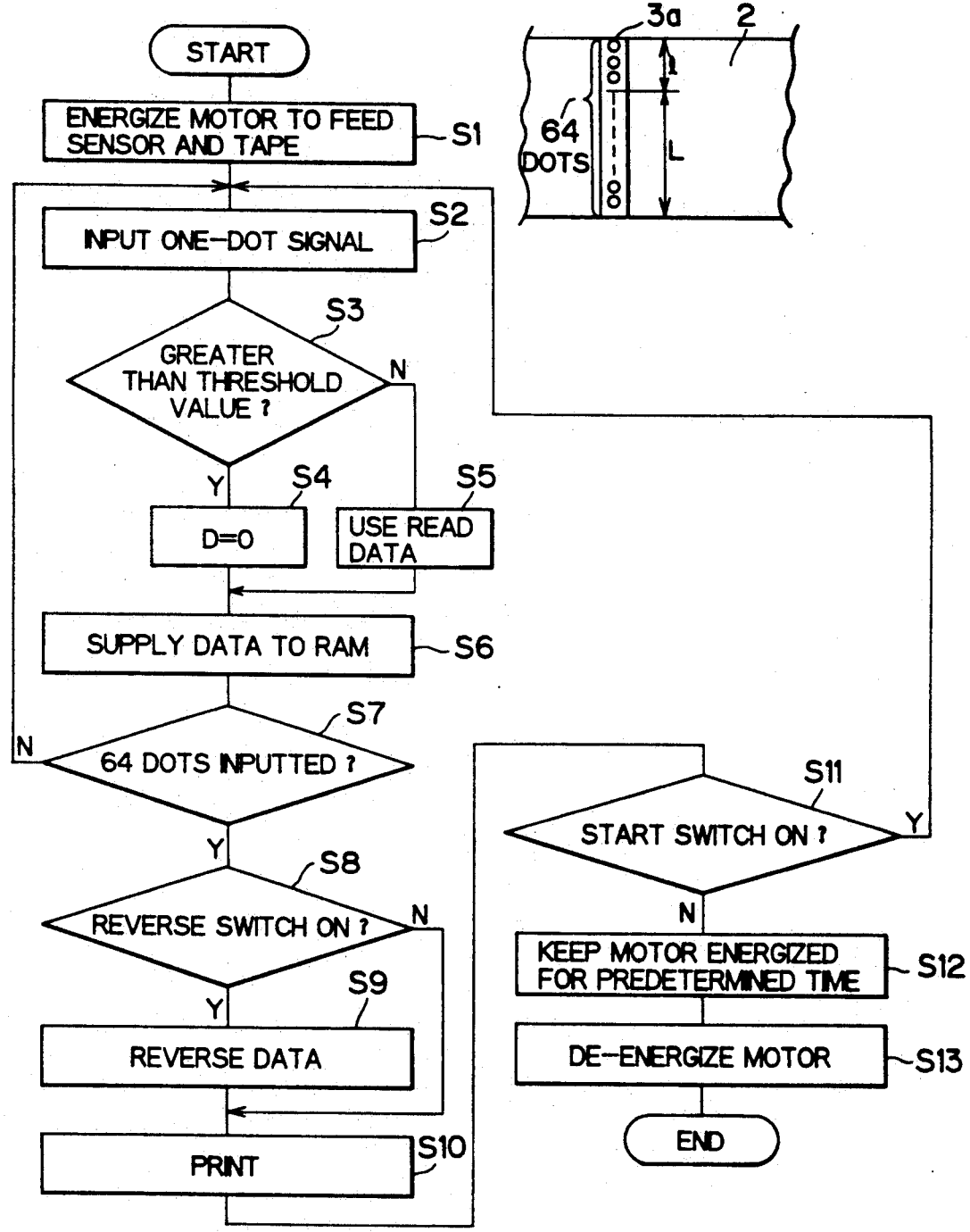
FIG. 4A and 4B is a flowchart illustrating an operation sequence of the handy-type copying devices according to the first and second embodiments.

As shown in FIG. 3, the output gear 11 of the motor M is held in meshing engagement with a large-diameter gear 31a coaxially fixed to a small-diameter gear 31b which is in turn held in meshing engagement with a large-diameter gear 32a coaxially fixed to a small-diameter gear 32b. The small-diameter gear 32b meshingly engages a large-diameter gear 33. The large-diameter gear 33 is held in meshing engagement with both the tape feed roller 20 and the gear 23a fixed to the takeup shaft 23 for winding the ink ribbon IR. The gear 23a is held in meshing engagement with a large-diameter gear 12b of a selector gear 12 which also has a small-diameter gear 12c coaxial with the large-diameter gear 12b. An idle gear 15 has a small-diameter gear 15a and a large-diameter gear 15b which are coaxial with each other. The large-diameter gear 12b of the selector gear 12 meshingly engages the small-diameter gear 15a.

The lever 13 has an upper end held against a slanted surface 6a of a depresser member formed on the start button 6. The tape T is fed from a tape supply reel TS to a print head 45 and the tape feed roller 20 through guide shafts G1, G2. The ink ribbon IR is fed from an ink ribbon supply reel IS to the takeup shaft 23 through the print head 45.

The copying operation by the handy-type copying device HC according to the second embodiment will be described with reference primarily to FIGS. 4A and 4B.

The copying device HC is placed on a printed document so that a desired character string R (e.g., "ABC") thereon falls within a range defined by the reading window 2 as shown in FIG. 1A. Then, the start button 6 is depressed to energize the motor M, starting to feed the sensor 3 and the tape T (step S1) with the meshing engagement of the small-diameter gear 12c of the selector gear 12 with the gear 16b. A reading element 3a of the sensor 3 reads the lowest order dot as shown in FIG. 4B (step S2). The sensor 3 has sixty-four reading elements aligned in a direction perpendicular to the longitudinal direction of the reading window 2 as previously described. The reading width L can be varied by sliding the reading width setting slider 9. More specifically, the outputs from the reading elements corresponding to a desired number of lower or upper order dots can be invalidated so as to restrict the range of the reading width L. One-dot signal outputted from each reading element of the sensor 3 is digitized by the associated A/D converter 62 to have a value in decimal notation ranging from 0 to 255.

Then, it is determined whether or not the output from the reading element in question corresponds to the invalidating dot. More specifically, assuming that the upper 3 dots in the width of 1 are to be invalidated as shown in FIG. 4B, the outputs from the first to third reading elements corresponding to the lower 3 dots are determined to be D=0 (step S5) upon comparison of a threshold value "3" indicative of the number of invalidating dots with the number assigned to the reading elements corresponding to the dot positions (step S3). If the comparison result indicates that the number assigned to the reading element now reading the dot is greater than the threshold value, then it is determined that D=1 (step S4). Either D=0 or D=1 is stored in the RAM 63 (step S6). When D=1, the digital value of the read dot is also stored in the RAM 63 whereas when D=0, the digital value of the dot is not stored in the RAM 63. In step S7, it is determined whether the signal inputted in step S2 is indicative of the sixty-fourth dot from the lowest order dot. Steps S2 through S7 are repeated until the inputted signal is indicative of the sixty-fourth dot from the lowest order dot.

Figure 7A:
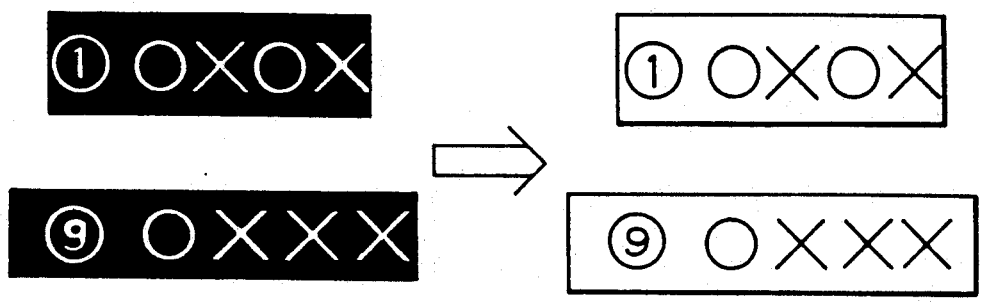
FIG. 7A is a view of character strings printed in reverse.

When the sixty-fourth dots have been read in step S7, it is determined in step S8 whether the reverse button 7 is turned on or not. If turned on, then the data stored in the RAM 63 is reversed (step S9). Therefore, white characters in a black background are converted into black characters in a white background as shown in FIG. 7A, and the converted data are subject to printing. At this time, the driver 66 for the print head 65 is supplied with the multi-value digital data which has been stored in the RAM 63 in association with D=1 (step S6). The driver 66 converts the multi-valued digital data supplied into a binary signal by comparison with a predetermined threshold value, and the print head 65 carries out printing based on the binary signal (step S10).

If the reverse button 7 is not turned on in step S8, then the data is subject to printing as it is (step S10) without effecting data reversal in step S8. In steps S2 through S10, only a vertical array of dots of the character string R is read and printed. Therefore, the storage capacity of the RAM 63 for storing data of the read dots may be relatively small, with a resultant reduction in the cost of the handy-type copying device.

Figure 7B:
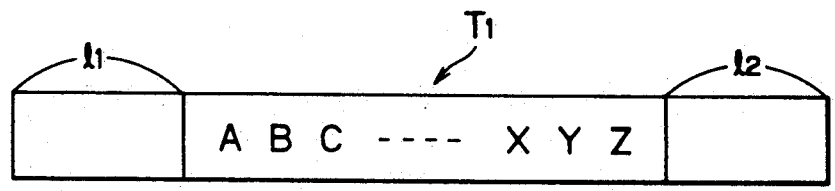
FIG. 7B is a view showing equal blank areas before and behind a printed character string on a tape.

In step S11, it is determined whether the start button 6 is depressed or not. If the start button 6 is depressed, then the routine goes back to step S2 to thereby repeat the above process. If the start button 6 is released, then the motor M remains energized for a predetermined period of time (step S12). More specifically, when the start button 6 is released, the process of reading the desired character string R (FIG. 1A) is finished. The lever 13 is pulled upwardly under the bias of a spring S thereby shifting the selector gear 12 into mesh with the idle gear 15a to rotate the wire drive gear 16 clockwise. In accordance with the clockwise rotation of the wire drive gear 16, the sensor 3 moves in the direction $A_2$ back to the home position. As shown in FIG. 7B, the CPU 61 is programmed so as to preserve equal blank areas $l_1$, $l_2$ on the tape $T_1$ at left and right sides thereof when printing the character string thereon. A cutter C (see FIG. 3) is positioned to cut those blank areas off the portion of the printed tape which contain the printed character string.

Though the motor is energized to rotate in one direction, the sensor 3 can be moved in both directions, i.e., fed and returned. While the sensor 3 is being returned, the tape T is fed, producing a waste tape length where no data is printed. To minimize the waste length, the gear ratio of the gears 12, 15b is varied to return the sensor 3 at an increased speed. Since the time required for the sensor 3 to go back to the home position is shortened, the time in which any waste tape length is fed is also reduced.

Figure 5:
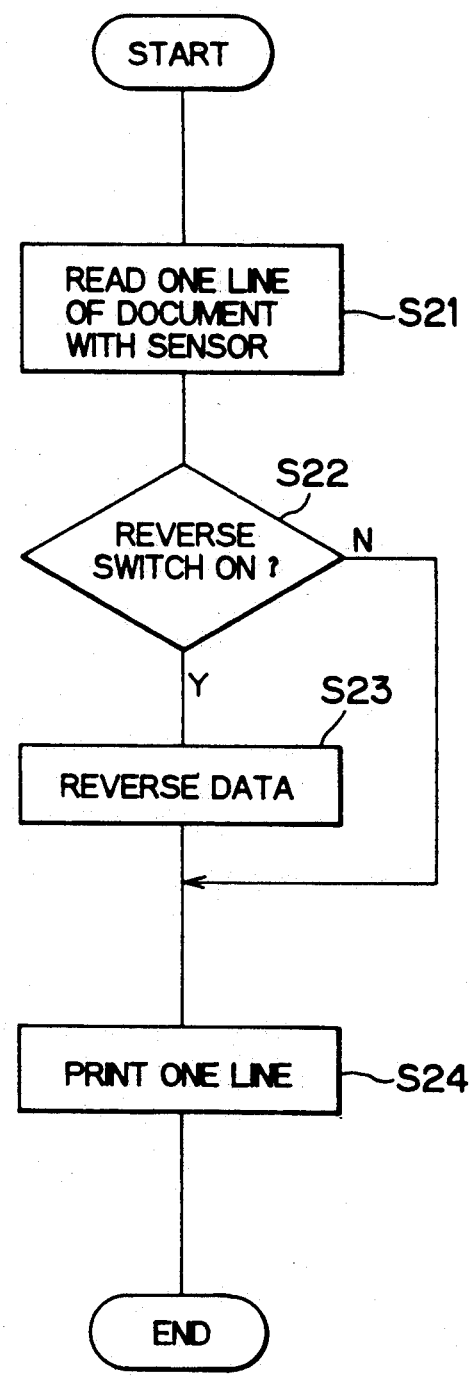
FIG. 5 is a flow chart illustrating another operation sequence of the handy-type copying devices according to the first and second embodiments.

FIG. 5 shows a flow chart of a modified operation sequence of the modified handy-type copying devices. According to the modification, the sensor 3 reads all of the character string R, and the read data is stored entirely in the RAM 63. The RAM 63 is thus required to have an increased storage capacity. More specifically, as shown in FIG. 5, the start button 6 is depressed to energize the motor M thereby moving the sensor 3 to read the desired character string in its entirety in step S21. The read data is stored in the RAM 63. At this time, the tape T is prevented from being fed by a known clutch or the like. When the reading and storage of the data of the character string is completed, if the reverse button 7 is turned on, then the stored data is reversed and printed in steps S22, S23 and S24. If the reverse button 7 is not turned on, the stored data is directly printed in step S24.

Figure 6:
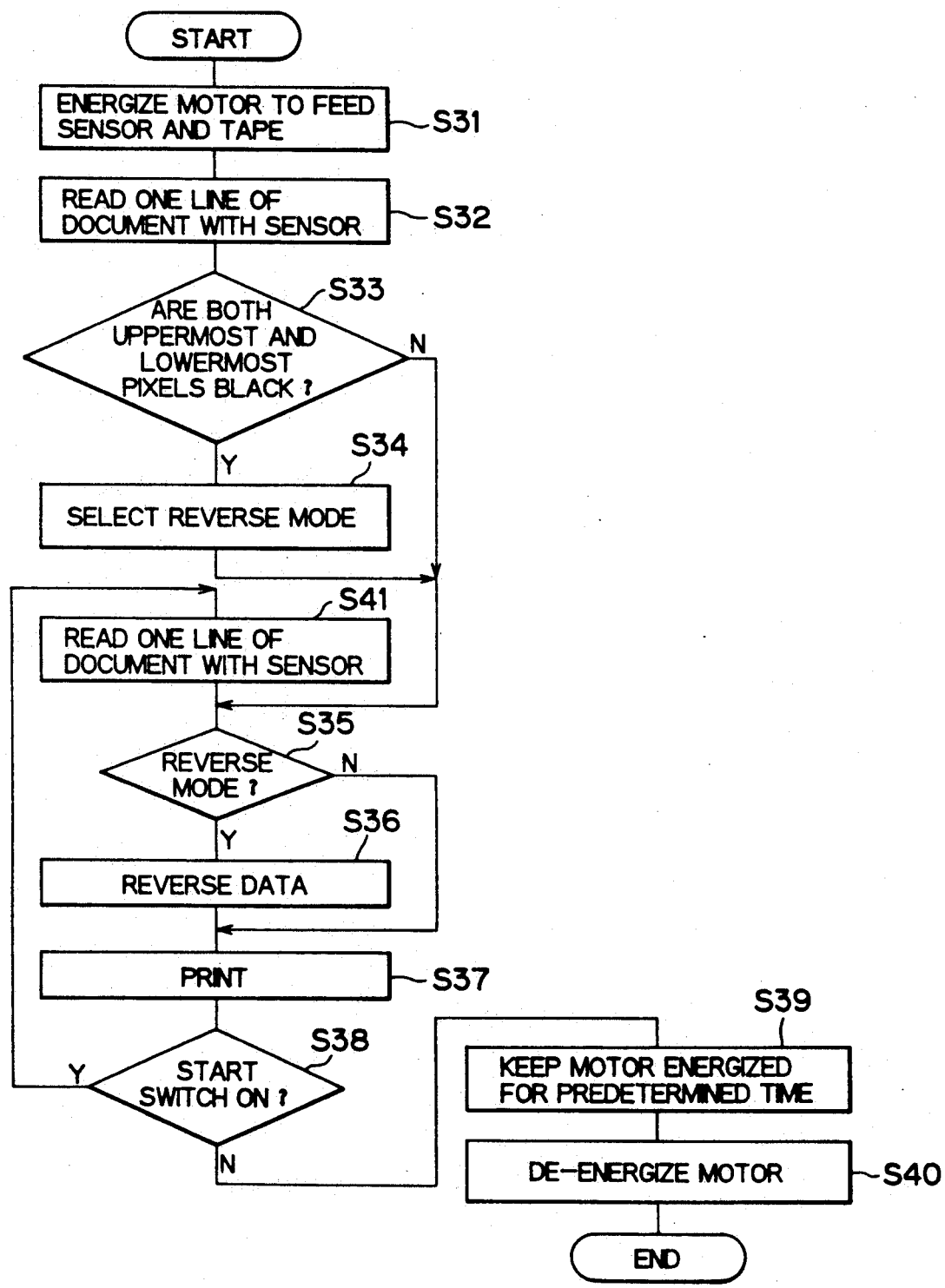
FIG. 6 is a flow chart illustrating still another operation sequence of the handy-type copying devices according to the first and second embodiments.

FIG. 6 shows a flow chart of another modified operation sequence of the handy-type copying devices. According to the modification shown therein, a black background is automatically detected, and when a black background is detected, the read data is automatically reversed.

Figure 7C:
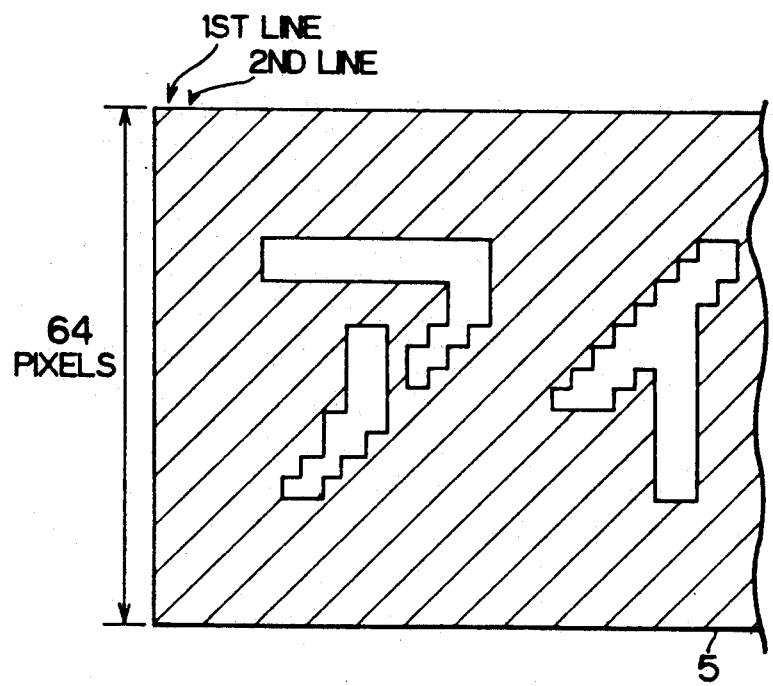
FIG. 7C is a view showing white characters in a black background.

As shown in FIG. 6, when the start button 6 is depressed, the motor M is energized in step S31. The sensor 3 reads one line of a printed document in step S32. At this time, the read line is the first line located on the lefthand end of the printed document 5 on which characters are printed as white characters in a black background, as shown in FIG. 7C. Then, in step S33, it is determined whether both uppermost and lowermost pixels on the first line are black or not. If both pixels are black, then since the probability that the printed document has a black background is high, a white-and-black reverse mode is selected in step S34. If either one of the uppermost and lowermost pixels is black or both the uppermost and lowermost pixels are white, then the printed document is determined as having a white background. Then, in step S35, it is determined whether the white-and-black reverse mode is selected or not. If the white-and-black reverse mode is selected, then the data read in step S32 is reversed in step S36, and printed in step S37. If the white-and-black reverse mode is not selected, then the read data is directly printed. In step S38, it is determined whether the start button 7 is turned on or not. If not, the motor M remains continuously energized in step S39, and then de-energized in step S40. If the start button 6 is turned on in step S38, then the sensor 3 reads the next line of the printed document in step S41, and steps S35 through S38 are thereafter repeated.

Figure 8:
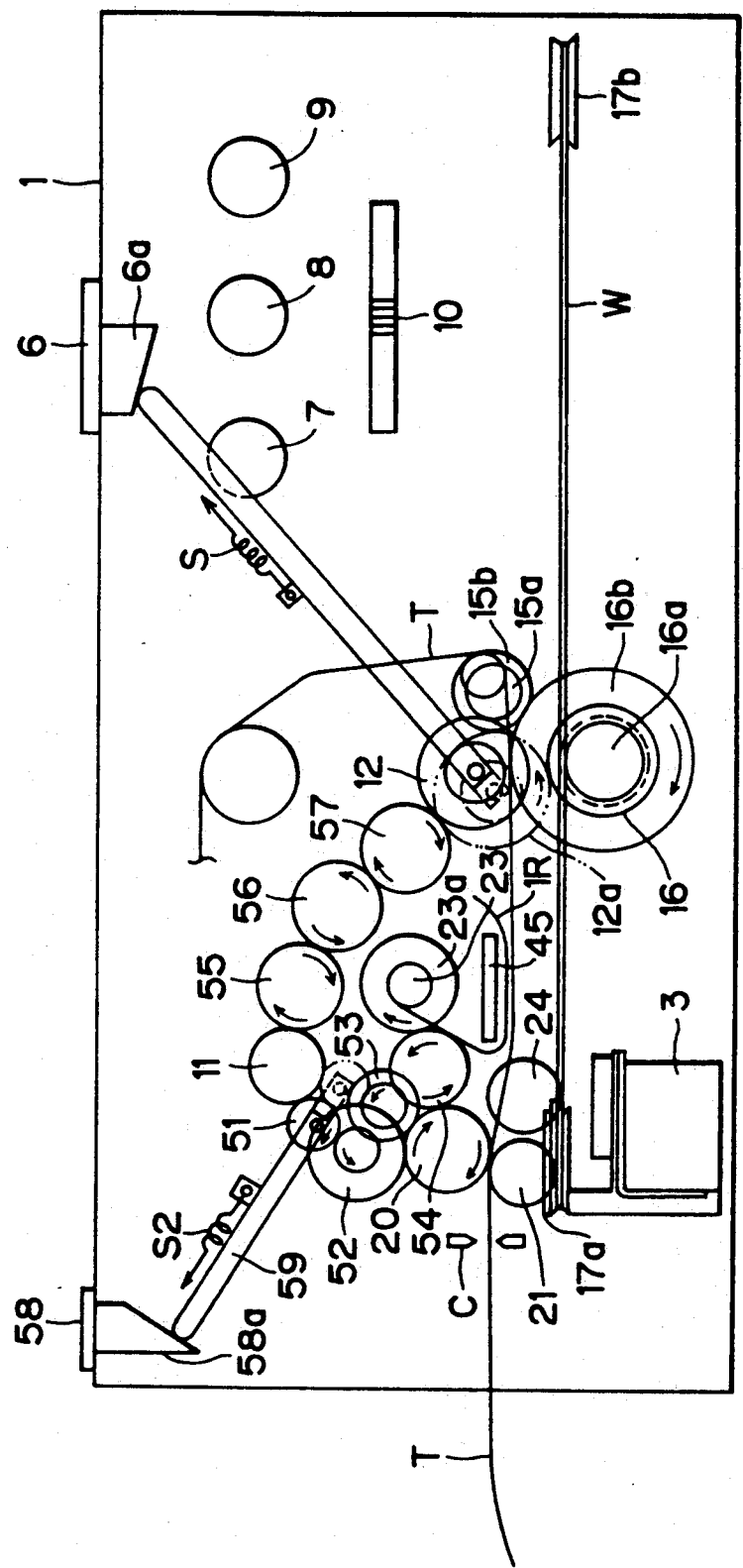
FIG. 8 is a view showing gear trains of a handy-type copying device according to a third embodiment of the present invention.

A third embodiment of the present invention will be described with reference to FIG. 8. The third embodiment is directed to a handy-type copying device for printing reduced-size characters upon reducing the width of characters to be printed.

An arrangement of gears will first be described with reference to FIG. 8. A tape supply and an ink ribbon supply are omitted from illustration in FIG. 8. As shown in FIG. 8, the output gear 11 of the motor M meshingly engages an idle gear 52 through a selector gear 51. The selector gear 51 is rotatably mounted on one end of a lever 59 whose other end is held against a lower slanted surface of a depressor member 58a of a size-reduction button 58. The lever 59 is normally urged upwardly to the left by a spring $S_2$. The idle gear 52 is held in meshing engagement with the gear 20 integral with the tape feed roller (not shown). The gear 20 meshingly engages an idle gear 54 which in turn meshingly engages the gear 23a integral with the takeup shaft 23. The output gear 11 is in meshing engagement with the selector gear 12 through idle gears 55, 56, 57.

Figure 9A:
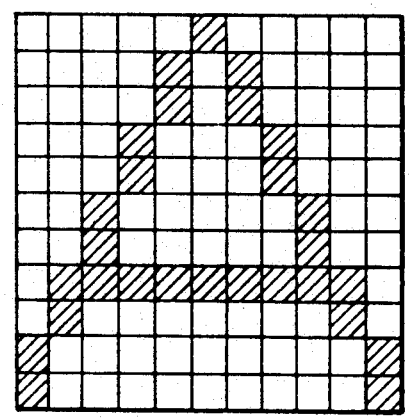
FIGS. 9A and 9B are views showing characters of normal and reduced sizes.
Figure 9B:
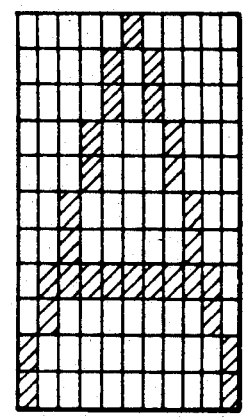

In operation, the sensor 3 is fed at a constant speed by the motor M through a gear train composed of gears 11, 55, 16, 57, 12, 16b. When the size-reduction button 58 is not depressed, a character is printed in a normal size as shown in FIG. 9A. At this time, the sensor 3 is fed through a gear train composed of gears 11, 51, 52, 20, 54, 23a. When the size-reduction button 58 is depressed, a character is printed in a laterally reduced size as shown in FIG. 9B. At this time, the sensor 3 is fed through a gear train composed of gears 11, 51, 53, 20, 54, 23a. As can be seen from these gear trains, the character is printed in a reduced size depending on the gear ratio of the gears 52, 53.

With the present invention, as described above, the user visually observes the object to be read through the window for determining a position of the image to be copied, and the reading means is moved to read the object. Then, the data which is read by the reading means is printed. Therefore, only a line or character string desired to be copied can be printed in the same pattern as the pattern on the object, i.e., without disturbing an alignment of the pattern.

Although the present invention has been described with respect to specific embodiments, it will be appreciated by one skilled in the art that a variety of changes or modifications may be made without departing from the scope of the invention. For example, the invention can be modified so that at least one of the print head 65 and the tape T moves relative to each other.

What is claimed is:

1. A copying device comprising:
 a housing defining an internal space of the copying device, said housing remaining stationary with respect to an object to be copied when a copy of the object is to be made;

window means for defining a maximum range of copying area;

visual recognition means for an operator to visually recognize an image falling within said window means when the object to be copied is held against said window means;

reading means for reading the image falling within said window, said reading means having a plurality of reading elements aligned in a predetermined direction and being reciprocal with forward and backward movements within the internal space in said housing in a direction intersecting the predetermined direction;

printing means for printing the image read by said reading means on a printing medium;

moving means for moving at least one of said printing medium and said printing means relative to each other; and control means for controlling said printing means to carry out printing of the image on a line-to-line basis as said plurality of reading elements read the image.

2. A copying device comprising:

window means for defining a maximum range of copying area;

visual recognition means for an operator to visually recognize an image falling within said window means when an object to be copied is held against said window means;

reading means for reading the image falling within said window and outputting image data, said reading means having a plurality of reading elements aligned in a predetermined direction and being reciprocal with forward and backward movements in a direction intersecting the predetermined direction;

invalidating means for invalidating a part of the image data and producing a valid image data;

printing means for receiving the valid image data and printing an image on a printing medium based on the valid image data;

moving means for moving at least one of said printing medium and said printing means relative to each other; and control means for controlling said printing means to carry out printing of the image on a line-to-line basis as said plurality of reading elements read the image.

3. The copying device according to claim 2, wherein said moving means comprises feeding means for feeding said printing medium to pass through said printing means when said printing means executes printing.

4. The copying device according to claim 3, further comprising a start button for starting a copying operation wherein said reading means moves forwardly from a home position during a time when said start button is being depressed whereas said reading means moves back to the home position when said start button is released.

5. The copying device according to claim 4, wherein said feeding means comprises a roller member rotatable about its own axis for feeding said print medium, and drive means operatively connected to said roller member for rotating said roller member.

6. The copying device according to claim 5, further comprising supplying means for supplying said print medium, said print medium being in the form of an elongated, web-like medium.

7. A copying device, comprising:

window means for defining a maximum range of copy area;

visual recognition means for an operator to visually recognize an image falling within said window means when an object to be copied is held against said window means;

reading means for reading the image falling within said window, said reading means having a plurality of reading elements aligned in a predetermined direction with said reading means reciprocally moving forward and backward in a direction perpendicular to the predetermined direction, wherein the predetermined direction is perpendicular to a longitudinal direction of said window means;

printing means for printing the image read by said reading means on a printing medium;

moving means for moving at least one of said printing medium and said printing means relative to each other, said moving means comprising feeding means for feeding said printing medium to pass through said printing means when said printing means executes printing; and control means for controlling said printing means to carry out printing of the image on a line-to-line basis as said plurality of reading elements read the image.

8. The copying device according to claim 7, further comprising a start button for starting a copying operation wherein said reading means moves forwardly from a home position during a time when said start button is being depressed whereas said reading means moves back to the home position when said start button is released.

9. The copying device according to claim 8, wherein said feeding means comprises a roller member rotatable about its own axis for feeding said print medium, and drive means operatively connected to said roller member for rotating said roller member.

10. The copying device according to claim 9, further comprising supplying means for supplying said print medium, said print medium being in the form of an elongated, web-like medium.

11. The copying device according to claim 9, wherein said drive means comprises a motor, a first transmission mechanism operatively coupled between said motor and said roller member.

12. The copying device according to claim 11, further comprising switching means connected to said motor, said switch means being rendered on when said start button is depressed to thereby energize said motor.

13. The copying device according to claim 12, further comprising a second transmission mechanism having an input and an output, said input of said second transmission mechanism being operatively coupled to said motor when said start button is depressed, and a third transmission mechanism having an input and an output, said input of said third transmission mechanism being operatively coupled to said motor when said start button is released, wherein said reading means is selectively coupled to said outputs of said second and third transmission mechanisms, and wherein said reading means is forwardly moved when coupled to said second transmission mechanism and is backwardly moved when coupled to said third transmission mechanism.

14. The copying device according to claim 13, wherein said printing medium is fed by said feeding means at a speed substantially equal to a moving speed at which said reading means is forwardly moved, whereby an equal magnification image is printed on said printing medium.

15. The copying device according to claim 13, wherein said printing medium is fed by said feeding means at a speed different from a moving speed at which said reading means is forwardly moved, whereby a reduced-size or an enlarged-size image is printed on said printing medium.

16. The copying device according to claim 11, further comprising ink ribbon supplying means for supplying an ink ribbon, and ink ribbon take-up means rotatable about its own axis for taking up said ink ribbon.

17. The copying device according to claim 16, further comprising a fifth transmission mechanism operatively coupled between said motor and said take-up reel for rotating said ink ribbon take-up means to thus wind said ink ribbon about the axis of said ink ribbon take-up means.

18. The copying device according to claim 17, wherein said ink ribbon is wound at a speed equal to the speed at which said printing medium is fed.

* * * * *